United States Patent [19]

Bowns et al.

[11] Patent Number: 4,877,512

[45] Date of Patent: Oct. 31, 1989

[54] SILVER/SILVER CHLORIDE COMPOSITIONS

[75] Inventors: Richard E. Bowns, Hacienda Heights; David L. Diepholz, Upland, both of Calif.

[73] Assignee: Advanced Products, Inc., Ontario, Calif.

[21] Appl. No.: 238,808

[22] Filed: Aug. 31, 1988

[51] Int. Cl.$^4$ .................... G01N 27/30; G01N 27/46
[52] U.S. Cl. .................... 204/435; 204/291; 204/292
[58] Field of Search ............... 204/435, 291, 292, 416, 204/418, 419

[56] References Cited

U.S. PATENT DOCUMENTS

| | | | |
|---|---|---|---|
| 3,662,745 | 5/1972 | Cosentino | 204/418 |
| 3,835,010 | 9/1974 | Levins | 204/435 |
| 4,507,194 | 3/1985 | Shimomura et al. | 204/435 |

OTHER PUBLICATIONS

Metz #7 Silver Flake Product Brochure (Metz Metallurgical Corporation).
SARAN F310 Vinylidene Chloride/Acrylonitrile Copolymer Product Brochure (Dow Chemical Company).

Primary Examiner—T. Tung
Attorney, Agent, or Firm—William A. Simons

[57] ABSTRACT

A conductive silver/silver chloride composition consisting essentially of:
- (a) about 6 to about 10.5 parts by weight of a vinylidene chloride thermoplastic polymer having a glass transition value of above about 100° F.;
- (b) at least a sufficient amount of an organic solvent capable of dissolving polymer (a);
- (c) about 47 to about 57 parts by weight of silver flake; and
- (d) about 8 to about 16 parts by weight of silver chloride.

6 Claims, No Drawings

SILVER/SILVER CHLORIDE COMPOSITIONS

BACKGROUND OF THE INVENTION

1. Field of the Invention

This invention relates to selected conductive compositions containing silver and silver chloride which are particularly useful for fabricating into human contact electrodes.

2. Brief Description of the Prior Art

Human contact electrodes, especially those used for measuring cardiovascular activity, have been made by applying (e.g. electrodepositing) a conductive film of metallic silver and silver chloride onto a tab-like substrate. The coated substrate is then affixed with a suitable adhesive by which the tab-like substrate (i.e. electrode) will maintain contact with the human body.

In taking a human cardiovascular reading, the electrode is affixed to a desired position on the human chest and an electrical connection is also attached to the electrode from an electrocardiogram (EKG) machine.

One problem with prior silver/silver chloride electrodes is that they may not work for at least 30 seconds after defibrillation electrical charge or shock was applied to a human chest. During that time, medical personnel will be unable to monitor the activity of the heart. This period of unoperability is caused by polarization of the electrode due to the defibrillation electrical charge. Accordingly, there is a need for electrode components which allow for a quicker electrode recovery after such a polarization event has occurred. The present invention is a solution to this problem.

BRIEF SUMMARY OF THE INVENTION

Accordingly, the present invention is directed to a conductive silver/silver chloride composition consisting essentially of:

(a) about 6 to about 10.5 parts by weight of a vinylidene chloride thermoplastic polymer having a glass transition value of above about 100° F.;

(b) at least a sufficient amount of organic solvent to completely dissolve said polymer (a);

(c) about 47 to about 57 parts by weight of silver flake; and (d) about 8 to about 16 parts by weight of silver chloride.

DETAILED DESCRIPTION OF THE PREFERRED EMBODIMENT

As stated above, the present invention encompasses the combination of four different components: a specific thermoplastic polymer, a suitable solvent for dissolving that polymer (e.g. methyl ethyl ketone), silver flake particles and silver chloride particles.

The vinylidene chloride thermoplastic polymer of the present invention provides a final composition having lower electrical resistivity than other types of thermoplastic polymers for a given amount of silver flake in the composition. The thermoplastic polymers of this invention have a glass transition point of above about 100° F. The glass transition temperature ($T_G$) is the temperature at which an amphorous material such as these polymers changes from a brittle, vitreous state to a plastic state. Preferably, the glass transition temperature is above about 110° F.

The preferred vinylidene chloride thermoplastic polymer is a vinylidene chloride copolymer sold by Dow Chemical Company of Midland, Mich. under the trade designation SARAN F310. This particular copolymer also comprises acrylonitrile groups and has a glass transition point of 111° F./44° C. Preferably, the vinylidene chloride thermoplastic polymer is employed in about 7 to about 10 parts by weight, based on the non-volatile parts of the composition.

Any organic solvent which dissolves the vinylidene chloride thermoplastic polymer may be employed in the present composition. Methyl ethyl ketone (MEK) is the preferred solvent for this composition because it quickly dissolves the vinylidene chloride thermoplastic polymer and has excellent drying speed on the thermal curing conditions employed (i.e. 150° F. to 300° F.). Preferably, the MEK is employed in about 50 to about 80 parts, based on total parts (i.e.. both volatiles and non-volatiles) by weight of the conductive composition.

The silver flake particles provide the present composition will be the desired electrical conductivity. The particle size of the silver flake is preferably from about 0.25 to about 1.2 microns, more preferably about 0.4–1.0 microns as measured by a Fisher Sub-sieve Sizer ASTM B330-65 at 10 inch pounds. If the silver flake is more or less than this range, the electrical properties may be adversely effected (e.g. the electrical resistivity of the composition may be too high) for the preferred use in human contact electrodes. The preferred silver flake is Metz #7 made by the Metz Metallurgical Corporation of South Plainfield, N.J.

Preferably, the amount of silver flake is from about 50 to about 55 parts by weight, based on the total non-volatile parts of the composition.

The amount of silver chloride used in the present composition provides specific electrical properties which aid in shortening recovery time after polarization. Preferably, the silver chloride is employed in about 10 to about 14 parts by weight, based on the total non-volatile parts of the composition.

Other minor conventional components may be added to the conductive composition. These include diluents or viscosity modifying agents, defoamer surfactants, waxes and the like. The viscosity of the final conductive composition of the invention is preferably from about 25 to about 30 seconds at 71° F. (#2 Zahn Cup).

The components of the present invention may be mixed together by any conventional means. Preferably, it is desirable to mix all of the ingredients together in a conventional agitated mixing apparatus (e.g. a steel ball mill) to create a uniform mixture wherein the polymer is dissolved in the solvent. This mixing operation preferably continues until a fineness of grind of the composition of greater than about 7 Hegmans is obtained.

The compositions of this invention may be applied to substrates by a variety of printing or spraying techniques, such as screen-printing. Once the conductive composition has been applied to the electrode substrate, it is dried and cured by exposing it and the substrate to elevated temperatures (about 150° F. to about 300° F.). Any conventional thermal curing apparatus may be used.

The conductive compositions of the present invention may be applied to conventional rigid or flexible substrates. Whether the substrate is flexible or rigid in nature, the substrate may or may not have to be pre-treated or pre-coated with any other substance before applying the composition of the present invention.

The following Example and Comparisons are shown to better illustrate the present invention. All parts and percentages are by weight unless otherwise explicitly stated.

EXAMPLE 1

A thermally curable dispersion was formed by adding vinylidene chloride polymer, methyl ethyl ketone, silver flake and silver chloride to a steel ball mill. These four components were mixed in the mill until a fineness of grind of greater than 7 Hegman units was obtained (i.e. about 24 hours). The relative weights of each of these four components are as follows:

| Component | Parts by Weight |
| --- | --- |
| Methyl ethyl ketone | 54.53 |
| vinylidene chloride/ acrylonitrile copolymer ① | 9.37 |
| silver flake ② | 52.10 |
| silver chloride ③ | 12.30 |
| | 128.30 |

① SARAN F310 sold by the Dow Chemical Company of Midland, Michigan.
② Metz #7 sold by the Metz Metallurgical Corporation of South Plainfield, New Jersey. This silver flake has a particle size of 0.4–1.0 micron Fisher Sub-sieve Sizer particle size and 0.7–1.3 m$^2$/g surface area.
③ This is −325 mesh silver chloride purchased from Colonial Metals of Elkton, Maryland.

The formed dispersion was tested and found to have the following properties:

| Specification | Amount |
| --- | --- |
| Density | 12.83 lbs./gal. |
| Non-volatile Weight Solids | 57.50% |
| Viscosity | 28 sec. (#2 Zahn cup, 71° F.) |
| Electrical Resistance | <.100 Ω/sq. @ 1.0 mil. |
| Tape Adhesion test | <10% change in resistance |
| Other analysis information for obtaining results in electrical resistance tape adhesion tests: | |
| Test substrate: | Mylar |
| Reduction: | None |
| Apply By: | Spray |
| Curing Schedule: | 30 minutes at 77° F. followed by 10 minutes at 225° F. |
| Oven Type: | Convection |

The formed dispersion was later printed onto human contact electrode substrates and then thermal cured to that substrate to form electrodes. These electrodes when tested possessed excellent electrical properties.

COMPARISON 1

A dispersion was formed, printed on the same type of electrode substrate, and tested from the following amounts of the same four components set forth in Example 1:

| Component | Parts by Weight |
| --- | --- |
| Methyl ethyl ketone | 82.8 |
| vinylidene chloride/ acrylonitrile copolymer ① | 12.5 |
| silver flake ② | 52.1 |
| silver chloride ③ | 12.3 |
| | 159.7 |

Electrodes made from this formulation possessed inferior electrical properties relative to the formulation of Example 1.

COMPARISON 2

A dispersion was formed, printed on the same type of electrode substrate and then tested from the following amounts of the same four components set forth in Example 1:

| Component | Parts by Weight |
| --- | --- |
| Methyl ethyl ketone | 49.88 |
| vinylidene chloride/ acrylonitrile copolymer ① | 6.36 |
| silver flake ② | 35.39 |
| silver chloride ③ | 8.35 |
| | 99.98 |

Electrodes made from this formulation possessed inferior electrical properties relative to the formulation of Example 1.

What is claimed is:

1. A conductive silver/silver chloride composition consisting essentially of:
   (a) about 6 to about 10.5 parts by weight of a vinylidene chloride thermoplastic polymer having a glass transition value of above about 100° F.;
   (b) at least a sufficient amount of an organic solvent capable of dissolving polymer (a);
   (c) about 47 to about 57 parts by weight of silver flake; and
   (d) about 8 to about 16 parts by weight of silver chloride.

2. The composition of claim 1 wherein said vinylidene chloride thermoplastic polymer (a) is a polyvinylidene chloride/acrylonitrile copolymer.

3. The composition of claim 1 wherein:
   (a) is present in about 7 to about 10 parts by weight;
   (b) is present in about 50 to about 80 parts by weight;
   (c) is present in about 50 to about 55 parts by weight; and
   (d) is present in about 10 to about 14 parts by weight.

4. The composition of claim 3 wherein said vinylidene chloride thermoplastic polymer (a) is a polyvinylidene chloride/acrylonitirle copolymer and said solvent (b) is methyl ethyl ketone.

5. The composition of claim 4 wherein:
   (a) is present in about 9.37 parts by weight;
   (b) is present in about 54.53 parts by weight;
   (c) is present in about 52.1 parts by weight; and
   (d) is present in about 12.3 parts by weight.

6. The composition of claim 1 wherein said silver flake has a particle size from about 0.25 to about 1.2 microns.

* * * * *